June 30, 1970  M. BABUNOVIC  3,517,794

REVERSIBLE CONTAINER HANDLING APPARATUS

Filed Feb. 19, 1968  2 Sheets-Sheet 1

INVENTOR
MOMIR BABUNOVIC
BY
Gravely, Lieder & Woodruff
ATTORNEYS

June 30, 1970 M. BABUNOVIC 3,517,794
REVERSIBLE CONTAINER HANDLING APPARATUS
Filed Feb. 19, 1968 2 Sheets-Sheet 2
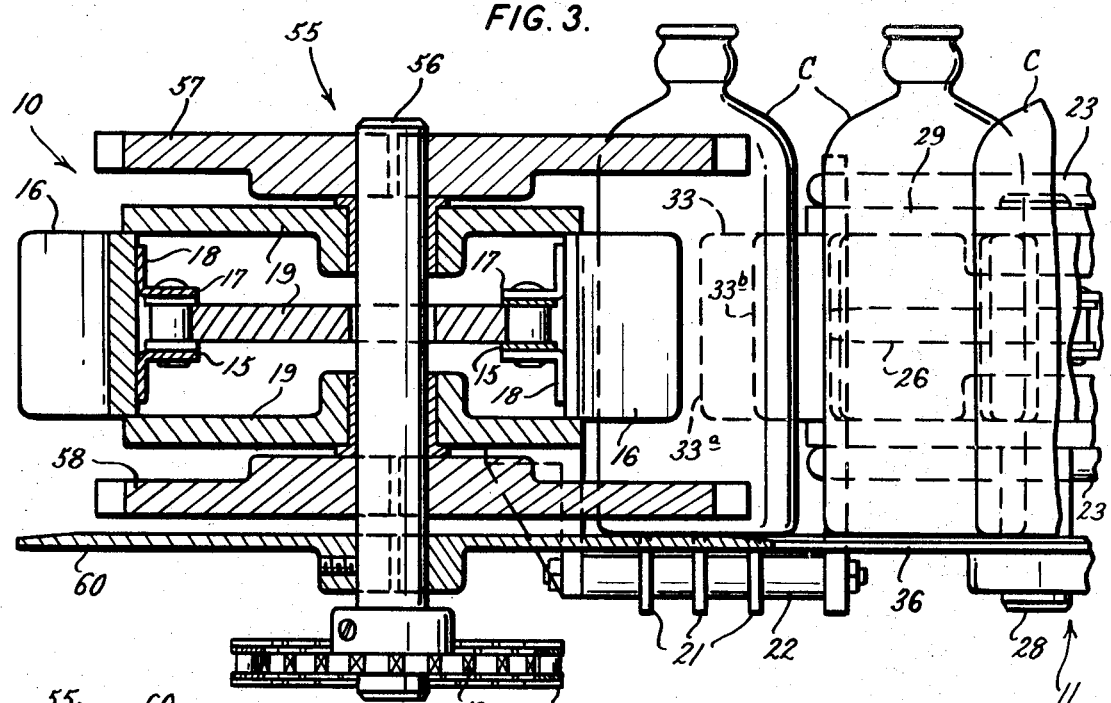
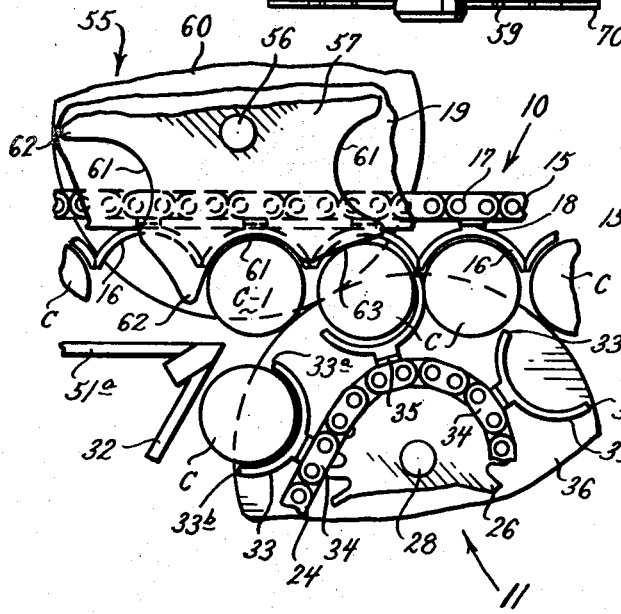
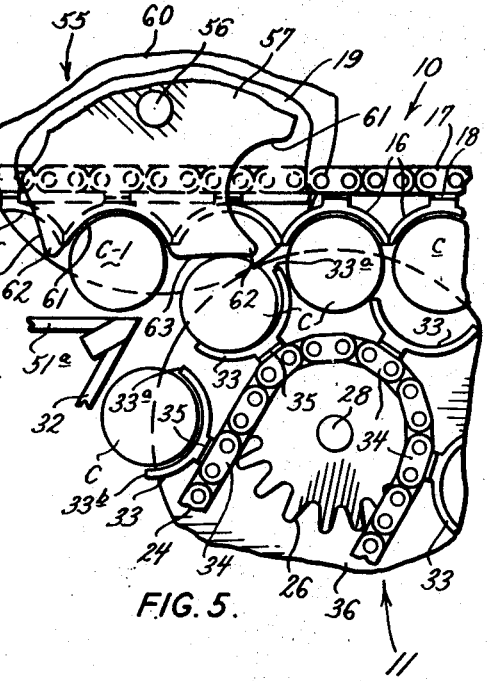
INVENTOR
MOMIR BABUNOVIC
BY
ATTORNEYS United States Patent Office 3,517,794
Patented June 30, 1970

3,517,794
REVERSIBLE CONTAINER HANDLING APPARATUS
Momir Babunovic, Des Peres, Mo., assignor to Barry-Wehmiller Company, St. Louis, Mo., a corporation of Missouri
Filed Feb. 19, 1968, Ser. No. 706,556
Int. Cl. B65g 47/26
U.S. Cl. 198—31                    12 Claims

ABSTRACT OF THE DISCLOSURE

Conveyor apparatus for handling containers at high speeds and arranged to move the containers in directions that will accomplish combining a plurality of lines of flow into one line or will accomplish dividing a single line of flow into a plurality of lines, the combining or dividing being selected by reversing the prime mover for the apparatus. The apparatus also includes means to stabilize the upright attitude of the containers so that toppling of the containers may be avoided.

---

This invention relates to reversible container handling apparatus, and is especially related to the handling of glass or frangible containers selectively flowing from a single line source into a plurality of discharge lines or flowing from a plurality of supply lines into a single discharge line.

The subject matter of this invention is an improvement in the high speed container combiner apparatus disclosed in the application of Babunovic, Kay and Shea, Ser. No. 685,838, filed Nov. 27, 1967, and assigned to the same assignee of this application. In the prior application the conveyor apparatus was limited to the capability of receiving containers from a plurality of sources and combining the same to achieve an extremely high-speed flow of containers. It has been discovered that with some modifications to be hereinafter described and claimed, containers may be handled at high velocities and can be either combined from a plurality of sources into one flow or divided from a single source into a plurality of discharge lines. The desire for such apparatus has existed for some time, particularly in the bottle or glass handling field, and it is desirable to be able to handle glass bottles or containers at considerably higher velocities and also to be able to selectively direct the flow in one direction or another with the same apparatus. This has been possible at relatively low velocities, but as the need for increased capacity made itself apparent, the older apparatus completely failed in the objectives desired.

It is, therefore, an important object of the present invention to provide apparatus that is fully capable of handling containers in either direction of flow without requiring changes in the apparatus.

It is also an important object of the present invention to provide simple conveyor components that will permit the achievement of reversible flow of containers within the same conveying apparatus, and will achieve high capacity results.

Other objects and advantages of the present invention will be set forth hereinafter in connection with the description of a preferred embodiment which illustrates the general principles of the invention.

A preferred embodiment of the present invention includes an arrangement of a first conveyor which establishes a path of movement for containers either into or away from a transfer zone and a plurality of cooperating conveyors arranged in the transfer zone for either receiving containers from or delivering containers to the first conveyor. In this general arrangement of conveyors there is provided means for maintaining the containers separated from each other and for controlling the position of the containers so that they remain stable and avoid jamming the conveyor apparatus by toppling, together with means cooperating with the first conveyor to control the flow of containers in the transfer zone.

The preferred embodiment of the present apparatus is shown in the drawings wherein:

FIG. 3 is a greatly enlarged fragmentary sectional elevational view taken at line 3—3 in FIG. 1;

FIG. 4 is a greatly enlarged fragmentary plan view showing the operation of the flow control means associated with the first conveyor; and FIG. 5 is a view similar to FIG. 4 but showing the flow control means in a different position of its motion.

Figure 1:
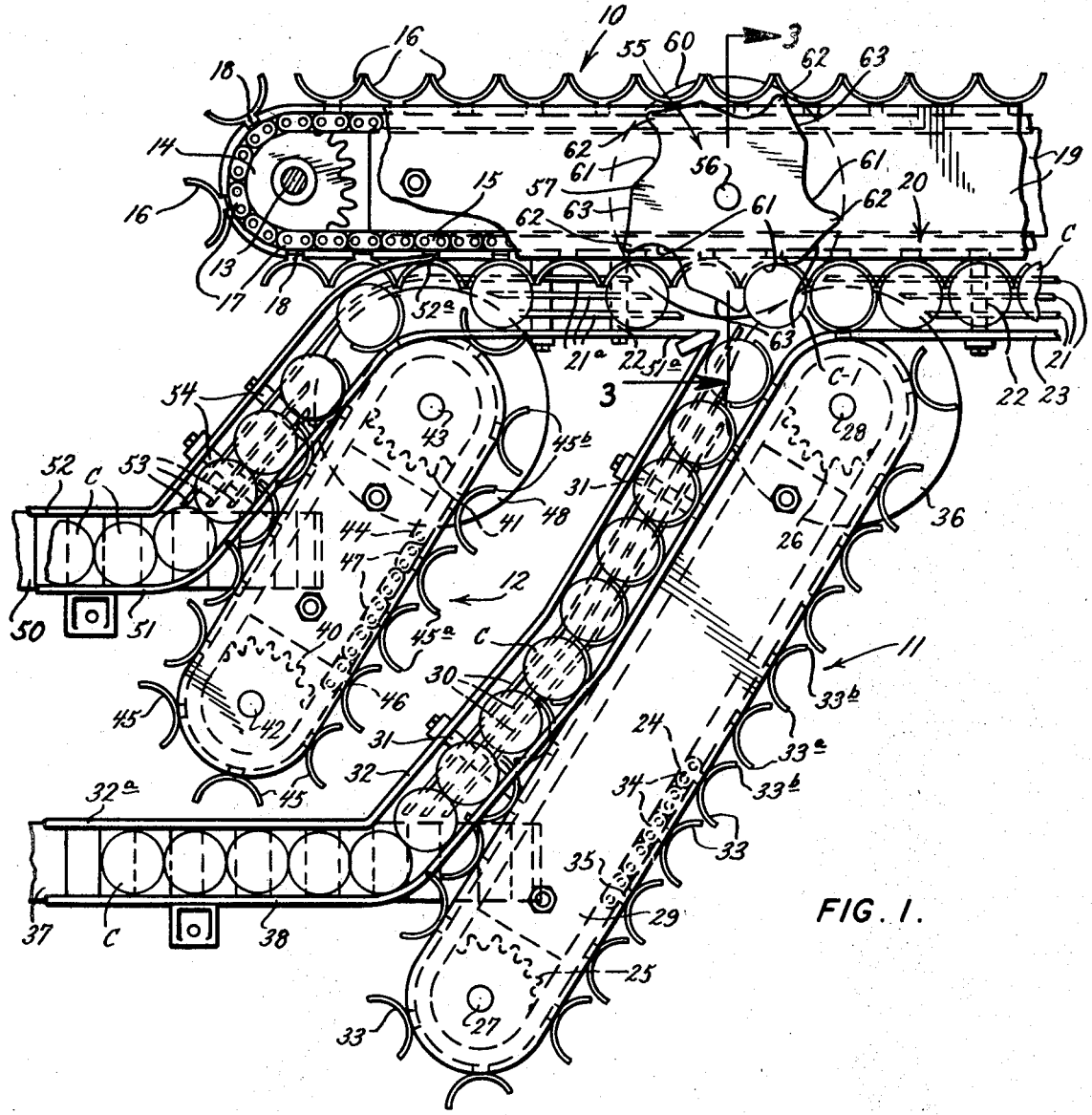
FIG. 1 is a fragmentary plan view of conveyor apparatus illustrating the mechanical and operational characteristics at the transfer zone where the movement of containers is most critical.

Referring now to FIGS. 1 and 3, the present apparatus is seen to include a first conveyor generally indicated at 10 and a pair of second conveyors generally indicated at 11 and 12. The first conveyor includes a drive shaft 13 to which is secured a sprocket wheel 14 suitable for engaging a conveyor roller chain 15 on which are secured semi-circular pockets 16. The pockets are secured to alternate chain links 17 by brackets 18 which are either made as an integral part of the links 17 or may be attached thereto in any suitable manner. Each pocket 16 is relatively symmetrically oriented with respect to the mounting thereof on the respective chain links 17. Suitable supporting structure 19 carried on leg means (not shown) may be utilized to support the span of the chain 15 between the drive sprocket 14 and a similar sprocket (not shown) located at the opposite end of the conveyor 10. The working pass 20 of the conveyor chain 15 is provided with a plurality of bars 21 carried on brackets 22 in position to support the bottoms of the respective containers which are engaged in the pockets 16. The bars 21 are interrupted and continue at 21a. A stationary guide fence 23 is attached to the outer end of the support brackets 22 in position to cooperate with the pocket 16 so that the containers C are suitably caged and maintained in separated condition. As will appear presently, the conveyor 10 may operate to bring the containers C into the transfer zone from a suitable source (not shown) for flow onto the respective conveyors 11 and 12. In this situation the containers C will move leftwardly along the support means 21 as viewed in FIG. 1. On the other hand, when the first conveyor 10 receives containers from the conveyors 11 and 12, it will necessarily have to be reversed so that the containers move rightwardly in the view of FIG. 1 along the support means 21 and 21a.

Still referring to FIG. 1 in particular, conveyor 11 comprises a suitable conveyor chain 24 trained around a drive sprocket 25 and an idler sprocket 26. The sprocket 25 is mounted on shaft 27 and sprocket 26 is mounted on a shaft 28, and suitable structure 29 is disposed therebetween to support the span of the conveyor chain 24 between the sprockets. The conveyor 11 includes support means 30 along one side for the purpose of supporting the bottoms of the respective containers C which are moved thereby. The support means 30 are mounted on suitable brackets 31 and the brackets also support a guide fence 32 for the purpose of retaining the containers in the conveyor pockets. Conveyor 11 is provided with pockets 33 which are connected to the links 34 of the chain 24 by means of brackets 35. In this arrangement the pockets 33 are asymmetrically mounted so that one margin 33a projects farther out than the other margin 33b. Furthermore, the conveyor 11 includes a rotary table 36 which in combination with the bottom support means 21 and 30 provides a continuous support for the bottoms of containers moving through the transfer zone between the first conveyor 10 and conveyor 11. Conveyor 11 is provided with a cooperating platform chain conveyor 37 which is arranged to bring the containers C into conveyor 11 or to receive containers from the conveyor 11 for flow away therefrom. The containers moving on the conveyor 37 are maintained in upright position between a side guide fence 38 that runs through the transfer zone and connects with fence 23, and a guide fence extension 32a of the fence 32.

Conveyor 12 is constructed in a manner quite similar to conveyor 11 and may be of a different length. For example, a drive sprocket 40 and an idler sprocket 41 are mounted on respective shafts 42 and 43 to support a conveyor chain 44 which carries the container pockets 45 which are asymmetrically attached by brackets 46 to the respective links 47 in the chain 44. Thus the sides 45a project farther out from the chain 44 than do the sides 45b. A rotary platform or table 8 is mounted on the shaft 43 in any suitable manner so as to support the bottoms of the respective containers C which are moved between the conveyor 10 and the conveyor 12. A platform conveyor 50 cooperates with the conveyor 12 either to bring containers into or take containers away from conveyor 12, and the containers move between an inner guide fence 51 and an outer guide fence 52. These fences have terminal ends 51a and 52a as shown in FIG. 1, with end 51a connected to the inner end of guide fence 32 for conveyor 11. The bottoms of the containers moving between the platform conveyor 50 and the rotary table 48 are supported on means 53 carried by brackets 54 attached to a suitable substructure (not shown) of the assembly.

In FIG. 3 there is shown a flow control cam or star wheel assembly 55 which includes a vertical shaft 56 on which are mounted a pair of cam wheels 57 and 58. The shaft 56 is provided with a drive sprocket 59 at its lower end, and above the drive sprocket 59 the shaft is provided with a rotary table 60 which runs very closely tangent to the rotary table 36 associated with conveyor 11. The support afforded by the rotary table 60 constitutes a continuation of support for the containers C afforded by the means 21 and 21a previously noted. There is also shown in FIG. 3 the structure 19 which is provided to support the link chain 15 and particularly the pockets 16 which are connected to the link chain 15 by brackets 18.

Each of the cam wheels 57 and 58 of flow control rotor assembly 55 is formed with a plurality of circumferentially spaced container receiving recesses 61 formed between a radially projecting nose 62 and a cam surface 63. As shown in FIG. 1, a container C-1 is positioned in a pocket 61 and at that position is also supported by the rotary tables 36 and 60. Assuming that the container C-1 at this point is moving leftwardly, it will be forced to remain under the control of the conveyor 10 because it is moving in a substantially linear direction. Should there be any crowding action on the particular container C-1 which might tend to cause it to move out of the pocket 61, it would immediately be restrained by the edge 33a of the adjacent pocket 33 on the conveyor 11, since the edge 33a is longer and projects into a position where it will prevent the container C-1 from moving excessively away from the pocket 61. If it is considered that container C-1 is moving rightwardly, it will be propelled by the recess 61 to match the velocity of the pocket 16 in conveyor 10.

Turning now to FIGS. 4 and 5, it can be seen in what manner the flow control assembly 55 operates to either retain a container within its pocket 61 so that the container is carried beyond conveyor 11 and into the transfer zone for conveyor 12, or to operate to direct a container by the action of the cam surface 63 out of the pocket 16 for conveyor 10 and into the pocket 33 for conveyor 11.

This latter transfer is aided by the action of the longer trailing edge 33a of pockets 33 which reach out and get behind the container substantially at a diametral position. In addition the pockets 33 are aided by the cam 63 (FIG. 5) to effect a very smooth transfer of containers. Due consideration of FIGS. 4 and 5 will show the characteristic operation of the flow control means 55 in respect of the transfer of containers to conveyor 11 from conveyor 10. The transfer of containers from conveyor 10 to conveyor 12, on the other hand, does not require the rotary control means in view of the fact that the guide fence 52 has a pick-off end 52a extending into a position where all of the containers passing the flow control means 55 must move out of the pocket 16 and into the pockets 45. When flow is reversed the end portion 52a of the fence 52 guides the containers into the pockets 16 for conveyor 10.

Figure 2:
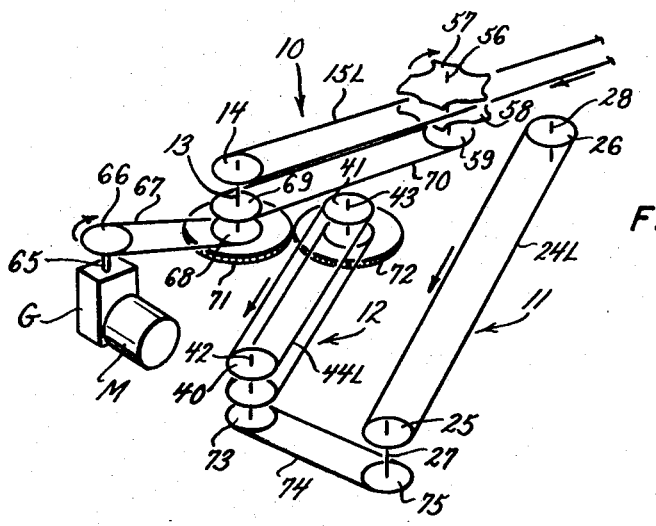
FIG. 2 is a fragmentary perspective view schematically showing the prime mover and drive arrangement for the various components of the apparatus shown in FIG. 1.

Turning now to FIG. 2, there is shown a suitable prime mover M connected to a gear box G from which the shaft 65 projects for the purpose of driving a sprocket wheel 66 which in turn powers a drive chain 67 for operating a sprocket 68 on the shaft 13 of the conveyor 10. The conveyor 10 is represented by the pitch line 15L of the conveyor chain 15. The shaft 13 is provided with a sprocket 69 which through the chain 70 drives the sprocket 59 (FIG. 3) which is connected to the shaft 56 for the flow control cam wheels 57 and 58. The shaft 13 also is provided with a suitable gear wheel 71 which is meshed with a similar gear wheel 72 mounted on shaft 43 for the conveyor 12. The shaft 43 drives the sprocket 41 and through the chain represented by the chain pitch line 44L drives the sprocket 40 on shaft 42. The shaft 42 drives a sprocket 73 which through the chain 74 drives a similar sprocket 75 on shaft 27, and shaft 27 drives the sprocket 25 which through the chain 24 represented by the chain pitch line 24L drives the sprockets 26 on shaft 28. Thus the various moving components of the conveyor assembly shown in FIG. 1 receives suitable operating power from the prime mover M.

If it is assumed in FIG. 1 that conveyor 10 is feeding containers C to the respective conveyors 11 and 12, it is appreciated that conveyor 10 will have to move at substantially twice the velocity of either conveyor 11 or 12. This is apparent because the flow control means 55 is arranged to direct certain containers C into conveyor 11 and to allow others to pass for eventual discharge into conveyor 12. The movement of pockets 61 in the cam wheels 57 and 58 is selected to accomplish alternate pass and discharge functions with respect to containers in the pockets 16 of conveyor 10. This function is illustrated in the several views of the drawings.

It has heretofore been pointed out that an important object of the present apparatus is to handle reverse flow of containers merely by reversing the direction of drive of the prime mover M. In the reverse flow from that above described the conveyors 37 and 50 in FIG. 1 will bring containers C into the respective conveyors 11 and 12 where the containers will be picked up by the pockets 33 and 45 respectively for movement concurrently toward the conveyor 10. As the conveyors 11 and 12 now both feed conveyor 10, it will be appreciated that conveyor 10 must move at a faster speed, which in the examples shown will be at approximately twice the speed of the conveyors 11 and 12. The pickoff end 52a of the guide fence 52 for conveyor 12 will smoothly direct the containers into every other pocket 16 in conveyor 10 because the conveyor 10 must move the pockets sufficiently fast so that there will be a blank pocket to receive the containers fed from conveyor 11. As the conveyor chain 15 approaches the transfer zone for conveyor 11, the flow control means 55 will rotate in a direction such that the cam surface 63 will be timed to assume an angular position with respect to each container brought into the transfer zone by the pockets 33 to assist in changing the direction of movement of the containers to the linear movement of the chain 15 for conveyor 10. This is best illustrated by considering that the progression of motion of the means 55 will be in accordance with FIG. 5 and then FIG. 4 as respects the progressive attitude of the cam surface 63 on the container brought into engagement therewith. This function will, it can be appreciated, prevent the containers being slammed into the pockets 16.

Another factor to be considered in the operation of the present apparatus concerns itself with the relative velocities to be established between conveyor 10 and conveyors 11 and 12. Since conveyor 10 in either direction of motion moves at a velocity substantially twice that of either conveyor 11 or 12, there is a critical velocity change that must be smoothly handled in order to avoid breaking frangible containers, such as those made of glass. This velocity transition is smoothly obtained by relating the end portions of conveyors 11 and 12 with a part of conveyor 10 where the motion is substantially linear. Thus the linear velocity of conveyors 11 and 12 at the point of circular travel of the respective pockets is converted into a velocity that is substantially co-ordinated with the velocity of conveyor 10 during the time interval when the pockets 33 and 45 of conveyors 11 and 12 respectively are moving in a path that is registered with the pockets 16 for conveyor 10. The transfer of containers from conveyor 10 to either of the conveyors 11 or 12 is effected in a very smooth and substantially shockless condition by the asymmetric positioning of the pockets 33 and 45 respectively, as the longer edge of these pockets is able to reach out and more securely cage the containers so that the driving impulse originally imparted to the containers by the pockets in conveyor 10 is smoothly picked up and assumed by the pockets for the conveyors 11 and 12.

Moreover, when the flow of containers is from the lower velocity conveyors 11 and 12 to the higher velocity conveyor 10 there is an ever present danger that the containers may be caused to topple if there is any jerk or momentary hesitation in the conveyor chains. Moving at the higher velocity which the present apparatus is fully capable of, any jerk or hesitation could result in the containers pitching forward, but since the pockets 33 and 45 present a greater supporting surface substantially diametrally of the containers, the containers will not be permitted to topple forwardly and jam the apparatus.

Still another significant feature of the present apparatus is found in the control action the conveyor pockets 16 and 33 exert on the containers C. Consideration of FIGS. 4 and 5 will make it evident that the motion of the pockets 16 leftwardly in FIG. 4 will find a leading container controlled by the cam 63 and the pocket 33 that is opposed to it. At this same instant in time the very next container in pocket 16 is under the control of the back surface of pocket edge 33a and the short edge 33b of the next trailing pocked 33. This latter container control action is even more explicitly seen in FIG. 5 and gives the best view of the control action achieved.

The foregoing description which has been given in relation to the several views in the drawings relates to a presently preferred embodiment of the present reversible container handling apparatus, but it is understood that changes and modifications may occur to those skilled in the art after reading and understanding the foregoing disclosure. Therefore, it is intended to include within the spirit and scope of the disclosure all possible changes and modifications not anticipated by relevant prior art.

What is claimed is:

1. Reversible container moving apparatus comprising: a first endless conveyor providing a container path of movement of linear direction and having a series of side open pockets movable in said linear direction; a second endless conveyor providing a container path of movement of curvilinear direction located adjacent said first conveyor linear path and having a series of side open pockets movable in said curvilinear direction, the pockets moving in said curvilinear direction being spaced apart such that the pockets and the spaces between pockets move into substantial registration with alternate one of said pockets moving in said linear direction; and container handling means adjacent said conveyors, said handling means having a series of container recesses registrable with the spaces between pockets of said second conveyor and a series of cam surfaces registrable with the pockets of said second conveyor, the cam surfaces acting with the registered pockets to control the handling of containers in such pockets and the alternate containers being handled in the spaces between pockets under control of said container recesses.

2. The apparatus of claim 1 wherein said side open pockets of said second conveyor are asymmetrically aligned to project one side farther into the path of container movement than the other side, said one side being active to locate containers relative to said container recesses.

3. The apparatus of claim 1 wherein said side open pockets of said first conveyor are symmetrically aligned and juxtaposed for stabilizing the movement of the pockets in the linear direction.

4. The apparatus of claim 1 wherein said container handling means rotates in timed relation with said movement of said first and second conveyors, and said recesses and cam surfaces are on the periphery thereof.

5. Container handling apparatus comprising: a first container moving conveyor including container support means laterally open pockets and rail means cooperatively operable to retain containers separated from each other, said first conveyor defining a path of movement in which containers are moved in a predetermined direction; a pair of second container moving conveyors including container support means laterally open pockets and rail means cooperatively operable to retain containers separated from each other, each of said second conveyors defining a nonlinear path of movement for said laterally open pockets adjacent said path of movement of said first conveyor; drive means operably connected to said conveyors to drive said laterally open pockets such that containers are transferred between said first conveyor and each of said second conveyors; and rotary means operably mounted adjacent said first conveyor to cooperate with said first mentioned container pockets to control the distribution of containers between the first conveyor and said pair of second conveyors.

6. Container conveying and transfer apparatus comprising: a pair of conveyors each having an endless propelling member and a series of laterally open pockets connected to said member said pockets having concave surfaces to receive containers to be conveyed; means operably supporting a first one of said conveyors to move containers along a linear path; other means operably supporting the second one of said conveyors to move containers along a path which has a nonlinear zone adjacent to said linear path of said first conveyor, the laterally open pockets of said second conveyor at the adjacency zone of the linear and nonlinear paths for said conveyors coming together in lateral registration with alternate pockets of said first conveyor to form cages for engaging alternate containers passing through said adjacency zone, and the remaining containers between the caged containers being retained in the pockets of said first conveyor and between two adjacent pockets of said second conveyor; and control means operable on both caged and retained alternate containers moved through said adjacency zone to receive and direct the containers relative to said linear and nonlinear paths for said conveyors, said control means having a series of alternate container engaging recesses for receiving said alternate containers and cam surfaces engaging said caged containers, whereby containers engaged in said recesses move through said linear path and containers engaged by said cam surfaces move through said nonlinear path.

7. In apparatus to transfer containers at high speed between adjacent conveyors the improvement which includes: a first conveyor having a series of laterally open container pockets movable in a substantially uniform linear direction, each pocket having an inner concave surface conforming to the containers; a second conveyor having a series of laterally open container pockets movable in a substantially uniform curvilinear direction substantially tangent to the linear direction of movement of said first series of pockets, each of said second series of pockets having an inner concave surface conforming to the containers; prime mover means operating said first and second conveyors at velocities such that the movement of said second conveyor series of pockets in the tangent portion of its movement are substantially matched with alternate ones of said first conveyor series of pockets, and in the tangent portion of movement certain containers are positionally controlled by being caged between said matched pockets and other containers are controlled by being positioned between pockets of said second series; and container transfer control means operably positioned adjacent said first conveyor, said control means having a periphery formed with spaced recesses and cam surfaces movable to engage predetermined ones of the containers moved by said conveyors.

8. In container handling apparatus: a first conveyor providing a linear path of movement, laterally open pockets on said first conveyor; a pair of second conveyors each having a circular end portion adjacent the linear path of movement of said first conveyor, laterally open pockets on each of said second conveyors movable thereby about said circular end portion into and out of registration with alternate ones of said pockets on said first conveyor; power means driving said conveyors in coordinated relation such that one of said second conveyors handles containers selectively into and out of alternate pockets on said first conveyor and the other of said second conveyors handles containers selectively into and out of the remaining alternate pockets on said first conveyor; and container control means operably disposed adjacent said first conveyor and one of said pair of second conveyors, said control means having alternate recesses and cam surfaces, with said recesses engaging containers moved by said first conveyor in said linear path and said cam surfaces engaging containers moved between said first conveyor and the last mentioned one of said pair of second conveyors, said control means operably connected to said power means.

9. The container handling apparatus set forth in claim 8 wherein said control means and said one of said pair of second conveyors is positioned up-stream relative to the remaining second conveyor upon the handling of containers from said first conveyor to said pair of second conveyors.

10. The container handling apparatus set forth in claim 8 wherein a full complement of containers in said pockets of said first conveyor is equal to a full complement of containers in each of said pockets of said pair of second containers.

11. The container handling apparatus set forth in claim 8 wherein said cam surfaces cooperate with successive pockets of said last mentioned one of said pair of second conveyors to engage containers in such pockets.

12. The container handling apparatus set forth in claim 8 wherein said control means is a rotary member having said recesses and cam surfaces spaced about the periphery thereof in alternate relation, and said cam surfaces move substantially tangentially of the path of travel of the pockets of said last mentioned one of said pair of second conveyors.

References Cited

UNITED STATES PATENTS

| 238,637 | 3/1881 | Blevin | 198—171 |
| 3,014,574 | 12/1961 | Nussbaum. | |
| 3,155,221 | 11/1964 | Griner | 198—76 |
| 3,297,141 | 12/1967 | Jamitsch | 198—110 |

RICHARD E. AEGERTER, Primary Examiner